E. N. WIDÉN.
ALTIMETER.
APPLICATION FILED JUNE 27, 1917. RENEWED APR. 28, 1919.
1,308,971.
Patented July 8, 1919.
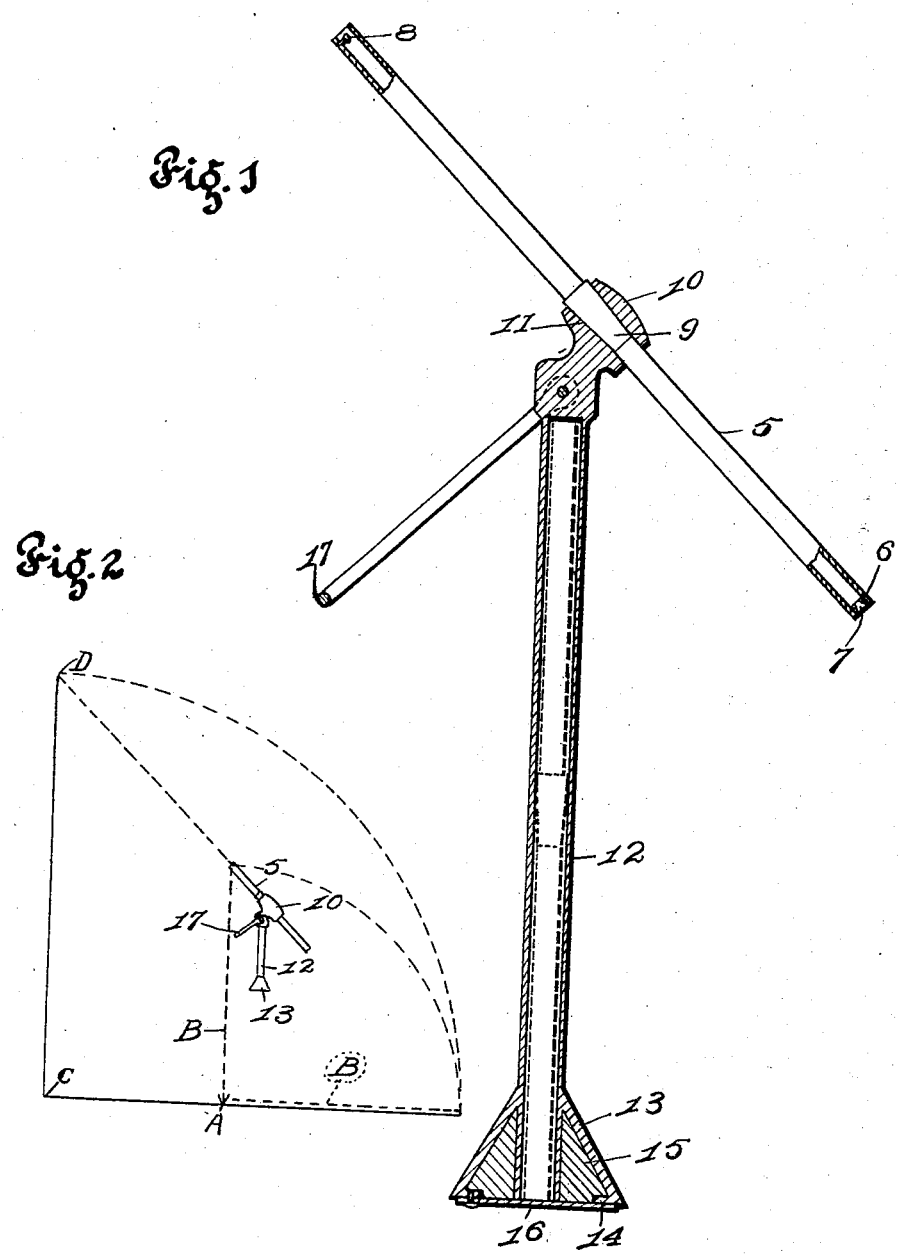
Inventor
Elmer N. Widén
by Edward E. Lingan
Atty.

UNITED STATES PATENT OFFICE.

ELMER N. WIDÉN, OF ST. LOUIS, MISSOURI, ASSIGNOR TO EVERSTICK ANCHOR COMPANY, OF ST. LOUIS, MISSOURI, A CORPORATION OF MISSOURI.

ALTIMETER.

1,308,971. Specification of Letters Patent. Patented July 8, 1919.

Application filed June 27, 1917, Serial No. 177,378. Renewed April 28, 1919. Serial No. 293,342.

*To all whom it may concern:*

Be it known that I, ELMER N. WIDÉN, a citizen of the United States, and resident of St. Louis and State of Missouri, have invented certain new and useful Improvements in Altimeters, of which the following is a specification containing a full, clear, and exact description, reference being had to the accompanying drawings, forming a part hereof.

My invention relates to improvements in altimeters and my object is to provide an inexpensive and compact instrument for determining the heights of objects having vertical sides.

My invention consists in the novel arrangement, combination and construction of parts as will be fully, clearly and concisely set forth in my specification, pointed out in my claims and illustrated by the accompanying drawings, in which Figure 1 shows in vertical sectional elevation, an instrument embodying my improvements, and Fig. 2 shows in diagram the method of using the instrument.

Referring to the drawings, by numerals, 5 designates a tube, having at its one end a plug 6 provided with a sight opening 7, and within the tube next the end opposite the sight opening a bead 8.

By preference this tube is provided, adjacent its longitudinal center, with an external tapering joint surface 9, a portion of which is of greater diameter than the tube proper.

The numeral 10 designates a block having formed therethrough a longitudinally tapered seat 11, whose dimensions are substantially the same as the tapering joint surface of the tube, and which affords a means for readily detachably securing the tube through the block.

Projecting from the block 10 is a tubular body 12 whose longitudinal axis is disposed at exactly forty-five degrees relative to the longitudinal axis of the tapered seat 11, and whose bore is by preference of a size capable of receiving thereinto the sight tube 5, when not in use.

By preference the tubular body 12 is provided at its lowermost end with a conical apron 13 having at its lowermost margin an inturned flange 14, in the plane of the lower end of the tube proper, whereby a "load" 15 such as a leaden body may be "run" therein and held, and which apron and load serve as a plummet for the instrument.

In order to prevent the loss of the sight tube when carried in the body 10, when not in use, I provide a clip 16 which may be swung relative to the end of the tubular body 10 to permit the insertion and withdrawal of the sight tube.

Secured to the block 10 on a pivot located in alinement with the longitudinal median line or axis of the body 10, is a handle 17, which constitutes a support over which the instrument, as a whole, may rock to assume a position with the body 10 held to a vertical angle by the plummet and the sight tube at an angle of forty-five degrees relative to the body 10.

An illustration of the use of the instrument follows:

Assuming it be desired to determine the height of an object having a vertical side, the operator grasps the handle 17, and places the sight tube before his eye, and shifts his position until the sight opening 7 and bead 8 aline with the uppermost point of the object whose height is to be determined. The "point of observation" designated A on the diagram is then "marked" and the approximate altitude of the instrument, designated B, noted. The distance from the base C of the object to the point A is then measured to which the dimension B is added which combined equal the height of the object from its base C to its top D. In other words, the distance from C to A, plus the dimension B equal the distance from C to D.

Having thus described my invention what I claim is:

1. An instrument of the class described comprising a weighted body portion, a handle pivotally carried by the upper end thereof, and a detachable sight tube carried by said body portion.

2. An instrument of the class described comprising a weighted body portion, a block carried by the upper end of said body portion, said block being provided with a tapering bore, a handle pivotally secured to said block, and a sight tube provided with a tapering enlargement seated in the tapering bore of said block.

3. An instrument of the class described comprising a weighted tubular body portion, a cover for closing an end of said tubular body portion, a block carried by the upper end of said tubular body portion, said block being provided with a tapering bore whose longitudinal axis is at an angle of forty-five degrees to the longitudinal axis of the tubular body portion, a handle pivoted to said block, and a tubular sight member provided with a tapering enlargement detachably mounted in the tapering bore of said block, and adapted to be stored in the tubular body portion.

In testimony whereof, I have signed my name to this specification, in presence of two subscribing witnesses.

ELMER N. WIDÉN.

Witnesses:
CLARA L. PRATT,
P. A. WEGENER.

Copies of this patent may be obtained for five cents each, by addressing the "Commissioner of Patents, Washington, D. C."